United States Patent [19]

Badovinatz et al.

[11] Patent Number: 5,790,772
[45] Date of Patent: *Aug. 4, 1998

[54] COMMUNICATIONS METHOD INVOLVING GROUPS OF PROCESSORS OF A DISTRIBUTED COMPUTING ENVIRONMENT

[75] Inventors: Peter Richard Badovinatz, Kingston; Tushar Deepak Chandra, Elmsford, both of N.Y.; Ajei Sarat Gopal, Fort Lee, N.J.; Orvalle Theodore Kirby, Pleasant Valley; John Arthur Pershing, Jr., Buchanan, both of N.Y.

[73] Assignee: International Business Machines Corporation, Armonk, N.Y.

[ * ] Notice: The term of this patent shall not extend beyond the expiration date of Pat. No. 5,764,875.

[21] Appl. No.: 641,386

[22] Filed: Apr. 30, 1996

[51] Int. Cl.[6] .................................. G06F 11/00
[52] U.S. Cl. ........................ 395/182.02; 395/200.31; 395/676
[58] Field of Search .................... 395/676, 682, 395/689, 200.03, 200.19, 182.02, 200.31

[56] References Cited

U.S. PATENT DOCUMENTS

| | | |
|---|---|---|
| 4,569,015 | 2/1986 | Dolev et al. . |
| 4,644,542 | 2/1987 | Aghili et al. . |
| 4,718,002 | 1/1988 | Carr . |

OTHER PUBLICATIONS

"Group Communication in the Amoeba Distributed Operating System", M. F. Kaashoek and A. S. Tanenbaum, Proc. of the IEEE 11th International Conf. on Distributed Computing Systems, pp. 222–230.

"Efficient Reliable Group Communication for Distributed Systems", M. F. Kaashoek and A.S. Tanenbaum, Ph.D. thesis at the Vrije Universiteit, 1992, pp. 1–50.

Kenneth P. Birman, "The Process Group Approach to Reliable Distributed Computing," pp. 1–35 (Jul. 3, 1991).

K. P. Birman, R. Cooper and B. Gleeson, "Design Alternatives for Process Group Membership and Multicast," pp. 1–31 (Dec. 18, 1991).

B. Oki, M. Pfluegl, A. Siegel and D. Skeen, "The Information Bus®—An Architecture for Extensible Distributed Systems," Teknekron Software Systems, Inc., Palo Alto, CA, pp. 58–68 (©1993).

David Powell, "Group Communication," *Communications of the ACM*, vol. 39, No. 4, pp. 50–96 (Apr. 1996).

*Primary Examiner*—William M. Treat
*Attorney, Agent, or Firm*—Floyd A. Gonzalez; Heslin & Rothenberg

[57] ABSTRACT

In a distributed computing environment having a plurality of groups of processors, each processor group maintains its own set of ordered messages. A message is sent to a group of processors. In particular, a request to multicast a message is sent to a leader of the group of processors, i.e., a group leader, and the group leader assigns a sequence number to the message to be sent, thereby providing an ordered message. Then, the group leader multicasts the ordered message to the group of processors. When the processors of the group receive the ordered message, each determines whether the message is in proper sequence order. If the message is out of order for a particular processor indicating that a message has been missed, then that particular processor requests the missing message from a processor within the group.

15 Claims, 7 Drawing Sheets

COMMUNICATIONS METHOD INVOLVING GROUPS OF PROCESSORS OF A DISTRIBUTED COMPUTING ENVIRONMENT

TECHNICAL FIELD

This invention relates, in general, to distributed computing environments and, in particular, to each group of processors of the distributed computing environment maintaining its own ordered set of messages.

CROSS REFERENCE TO RELATED APPLICATIONS

This application contains subject matter which is related to the subject matter of the following applications, which are assigned to the same assignee of this application and are filed on the same day as this application. Each of the below listed applications is hereby incorporated herein by reference:

"An Application Programming Interface Unifying Multiple Mechanisms," by P. R. Badovinatz et al., Ser. No. 08/960,074 which is a file wrapper continuation of Ser. No. 08/640,305, now abandoned;

"A Method For Managing Membership Of A Group Of Processors In A Distributed Computing Environment," by P. R. Badovinatz et al., Ser. No. 08/640,412;

"Utilizing Batch Requests To Present Membership Changes To Process Groups," by P. R. Badovinatz et al., Ser. No. 08/641,445;

"Method For Group Leader Recovery In A Distributed Computing Environment," by P. R. Badovinatz et al., U.S. Pat. No. 5,704,032; and "A Method For Barrier Synchronization In A Distributed Computing Environment," by P. R. Badovinatz et al., Ser. No. 08/640,218.

BACKGROUND ART

In many data processing systems, messages are broadcast to all of the processors of the system. That is, there exists a single message stream, in which all of the nodes receive all of the messages. This all to all communication places a practical limit on the number of processors that can be a part of the system.

Therefore, a need exists for a communications mechanism in which messages can be forwarded to particular groups of processors within the system. A further need exists for a mechanism that permits one set of messages to be sent to one group of processsors, while another set of messages is sent to another group of processors, and each group maintains its own set of messages. A further need exists for a mechanism that orders the messages in a particular sequence, such that a processor knows if it is missing a particular message. Additionally, a need exists for a mechanism that enables a processor to obtain any missing message, without needing to obtain the missing message from persistent storage. A further need exists for a mechanism that can quiesce a multicast stream.

SUMMARY OF THE INVENTION

The shortcomings of the prior art are overcome and additional advantages are provided through the provision of a communications mechanism for a distributed computing environment. A first message is sent to a first group of processors of the distributed computing environment and a second message is sent to a second group of processors. The first group of processors maintains the first message and the second group of processors maintains the second message.

In one embodiment of the invention, a request is sent to a group leader of the first group of processors to multicast the first message. The group leader assigns a sequence number to the first message providing a first ordered message. Then, the group leader multicasts the first ordered message to the first group of processors. Each processor of the first group of processors determines whether the first ordered message it received is in proper sequence order. If a processor determines that the ordered message is in improper sequence order indicating that a message is missing, then that processor requests the missing message from a processor within the group.

The communications mechanism of the present invention advantageously eliminates the need for separate stable storage typically used when a failure occurs within the system. Instead, the mechanism of the present invention, replicates key parts of data in a recoverable fashion across the processors that may need that data. Individual processors are advantageously aware that they are missing data and are provided a mechanism for retrieving that data from any other processor within its group that has the data. That is, information that is needed by any individual group is replicated across all of the processors of that group and thus, it can recover that data without needing or relying on separate, stable hardware. This reduces the costs associated with additional hardware and provides for a flexible system.

The communications mechanism of the present invention also advantageously enables quiescing of a multicast stream.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In one embodiment, the techniques of the present invention are used in distributed computing environments in order to provide multicomputer applications that are highly-available. Applications that are highly-available are able to continue to execute after a failure. That is, the application is fault-tolerant and the integrity of customer data is preserved.

It is important in highly-available systems to be able to coordinate, manage and monitor changes to subsystems (e.g., process groups) running on processing nodes within the distributed computing environment. In accordance with the principles of the present invention, a facility is provided that implements the above functions. One example of such a facility is referred to herein as Group Services.

Group Services is a system-wide, fault-tolerant and highly-available service that provides a facility for coordinating, managing and monitoring changes to a subsystem running on one or more processors of a distributed computing environment. Group Services, through the techniques of the present invention, provides an integrated framework for designing and implementing fault-tolerant subsystems and for providing consistent recovery of multiple subsystems. Group Services offers a simple programming model based on a small number of core concepts. These concepts include, in accordance with the principles of the present invention, a clusterwide process group membership and synchronization service that maintains application specific information with each process group.

As described above, in one example, the mechanisms of the present invention are included in a Group Services facility. However, the mechanisms of the present invention can be used in or with various other facilities, and thus, Group Services is only one example. The use of the term Group Services to include the techniques of the present invention is for convenience only.

Figure 1:
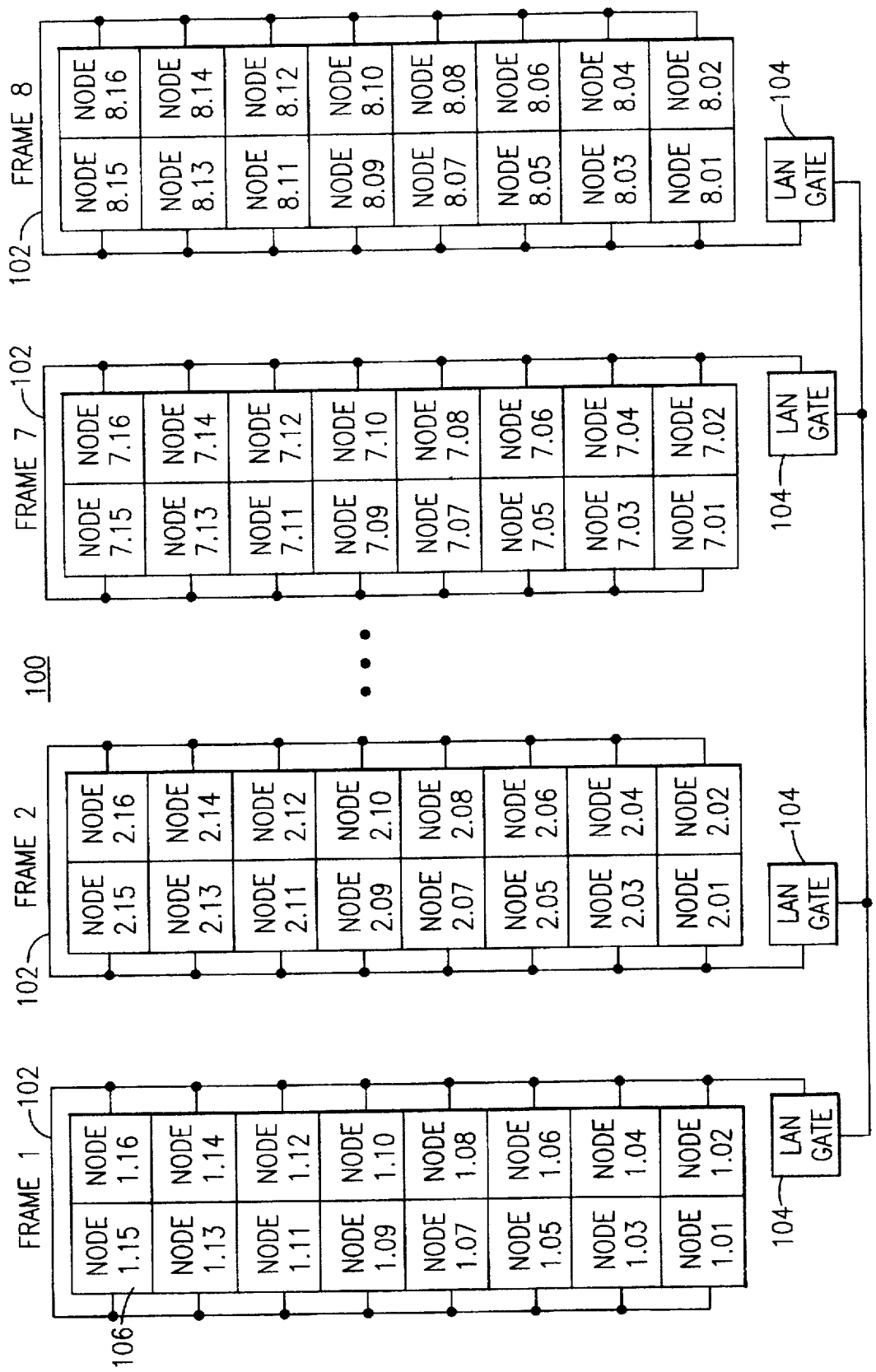
FIG. 1 depicts one example of a distributed computing environment incorporating the principles of the present invention.

In one embodiment, the mechanisms of the present invention are incorporated and used in a distributed computing environment, such as the one depicted in FIG. 1. In one example, distributed computing environment 100 includes, for instance, a plurality of frames 102 coupled to one another via a plurality of LAN gates 104. Frames 102 and LAN gates 104 are described in detail below.

In one example, distributed computing environment 100 includes eight (8) frames, each of which includes a plurality of processing nodes 106. In one instance, each frame includes sixteen (16) processing nodes (a.k.a. processors). Each processing node is, for instance, a RISC/6000 computer running AIX, a UNIX based operating system. Each processing node within a frame is coupled to the other processing nodes of the frame via, for example, an internal LAN connection. Additionally, each frame is coupled to the other frames via LAN gates 104.

As examples, each LAN gate 104 includes either a RISC/6000 computer, any computer network connection to the LAN, or a network router. However, these are only examples. It will be apparent to those skilled in the relevant art that there are other types of LAN gates, and that other mechanisms can also be used to couple the frames to one another.

In addition to the above, the distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. All of these variations are considered a part of the claimed invention.

Figure 2:
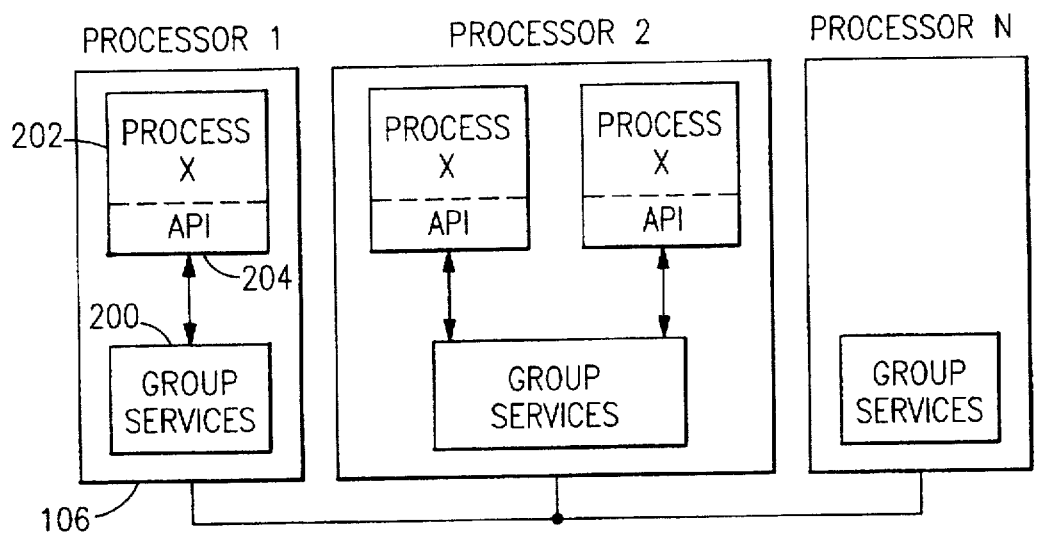
FIG. 2 depicts one example of an expanded view of a number of the processing nodes of the distributed computing environment of FIG. 1, in accordance with the principles of the present invention.

In one embodiment, a Group Services subsystem incorporating the mechanisms of the present invention is distributed across a plurality of the processing nodes of distributed computing environment 100. In particular, in one example, a Group Services daemon 200 (FIG. 2) is located within one or more of processing nodes 106. The Group Services daemons are collectively referred to as Group Services.

Group Services facilitates, for instance, communication and synchronization between multiple processes of a process group, and can be used in a variety of situations, including, for example, providing a distributed recovery synchronization mechanism. A process 202 (FIG. 2) desirous of using the facilities of Group Services is coupled to a Group Services daemon 200. In particular, the process is coupled to Group Services by linking at least a part of the code associated with Group Services (e.g., the library code) into its own code. In accordance with the principles of the present invention, this linkage enables the process to use the mechanisms of the present invention, as described in detail below.

Figure 3:
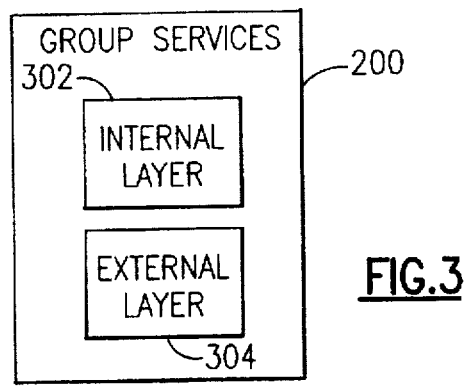
FIG. 3 depicts one example of the components of a Group Services facility, in accordance with the principles of the present invention.

In one embodiment, a process uses the mechanisms of the present invention via an application programming interface 204. In particular, the application programming interface provides an interface for the process to use the mechanisms of the present invention, which are included in Group Services, as one example. In one embodiment, Group Services 200 includes an internal layer 302 (FIG. 3) and an external layer 304, each of which is described in detail below.

In accordance with the principles of the present invention, internal layer 302 provides a limited set of functions for external layer 304. The limited set of functions of the internal layer can be used to build a richer and broader set of functions, which are implemented by the external layer and exported to the processes via the application programming interface. The internal layer of Group Services (also referred to as a metagroup layer) is concerned with the Group Services daemons, and not the processes (i.e., the client processes) coupled to the daemons. That is, the internal layer focuses its efforts on the processors, which include the daemons. In one example, there is only one Group Services daemon on a processing node; however, a subset or all of the processing nodes within the distributed computing environment can include Group Services daemons.

Figure 4:
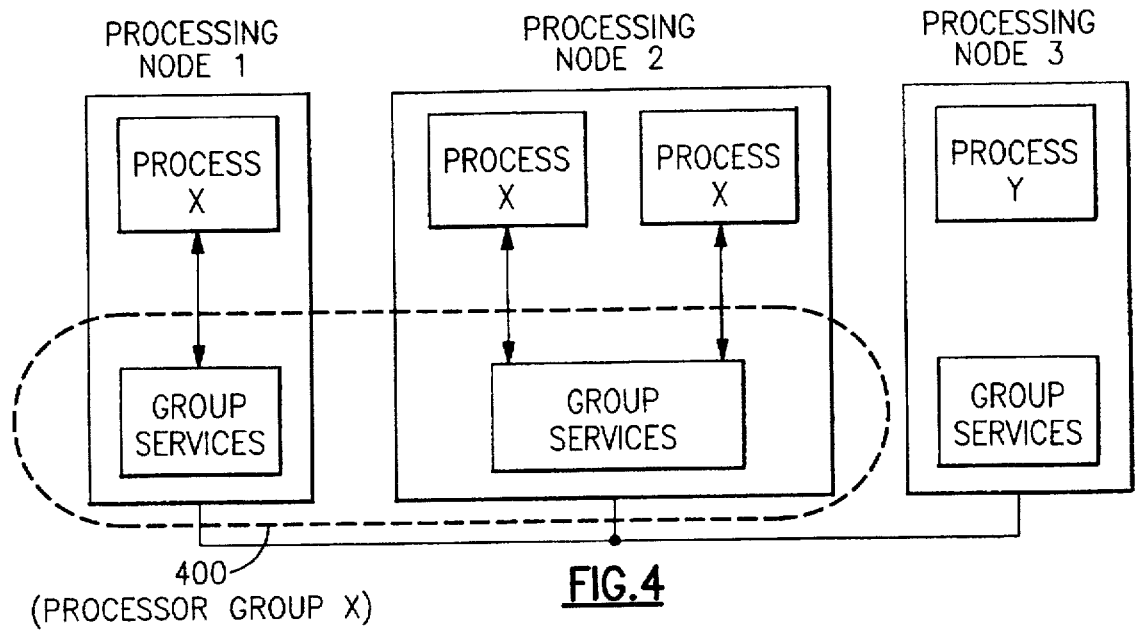
FIG. 4 illustrates one example of a processor group, in accordance with the principles of the present invention.

The internal layer of Group Services implements functions on a per processor group basis. There may be a plurality of processor groups in the network. Each processor group (also, referred to as a metagroup) includes one or more processors having a Group Services daemon executing thereon. The processors of a particular group are related in that they are executing related processes. (In one example, processes that are related provide a common function.) For example, referring to FIG. 4, a Processor Group X (400) includes Processing Node 1 and Processing Node 2, since each of these nodes is executing a process X, but it does not include Processing Node 3. Thus, Processing Nodes 1 and 2 are members of Processor Group X. A processing node can be a member of none or any number of processor groups, and processor groups can have one or more members in common.

In order to become a member of a processor group, a processor needs to request to be a member of that group. In accordance with the principles of the present invention, a processor requests to become a member of a particular processor group (e.g., Processor Group X) when a process related to that group (e.g., Process X) requests to join a corresponding process group (e.g., Process Group X) and the processor is not aware of that corresponding process group. Since the Group Services daemon on the processor handling the request to join a particular process group is not aware of the process group, it knows that it is not a member of the corresponding processor group. Thus, the processor asks to become a member, so that the process can become a member of the process group. (One technique for becoming a member of a processor group is described in detail further below.)

Internal layer 302 (FIG. 3) implements a number of functions on a per processor group basis. These functions include, for example, maintenance of group leaders, insert, multicast, leave, and fail, each of which is described in detail below.

In accordance with the principles of the present invention, a group leader is selected for each processor group of the network. In one example, the group leader is the first processor requesting to join a particular group. As described herein, the group leader is responsible for controlling activities associated with its processor group(s). For example, if a processing node, Node 2 (FIG. 4), is the first node to request to join Processor Group X, then Processing Node 2 is the group leader and is responsible for managing the activities of Processor Group X. It is possible for Processing Node 2 to be the group leader of multiple processor groups.

Figure 5A:
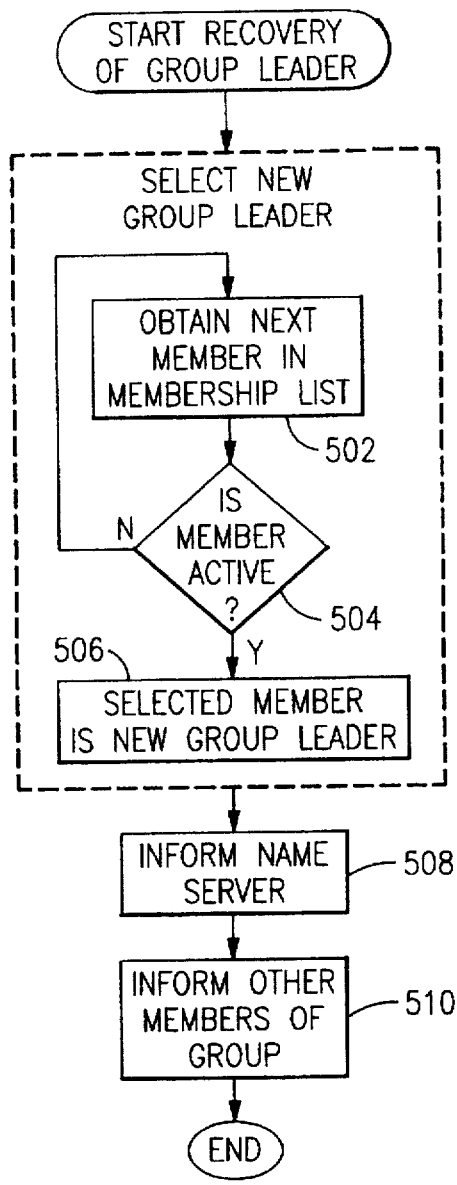
FIG. 5a depicts one example of the logic associated with recovering from a failed group leader of the processor group of FIG. 4, in accordance with the principles of the present invention.

If the group leader is removed from the processor group for any reason, including, for instance, the processor requests to leave the group, the processor fails or the Group Services daemon on the processor fails, then group leader recovery takes place. In particular, a new group leader is selected, STEP 500a "SELECT NEW GROUP LEADER" (FIG. 5a).

In one example, in order to select a new group leader, a membership list for the processor group, which is ordered in sequence of processors joining the group, is scanned, by one or more processors of the group, for the next processor in the list, STEP 502 "OBTAIN NEXT MEMBER IN MEMBERSHIP LIST." Thereafter, a determination is made as to whether the processor obtained from the list is active, INQUIRY 504 "IS MEMBER ACTIVE?" In one embodiment, this is determined by another subsystem distributed across the processing nodes of the distributed computing environment. The subsystem sends a signal to at least the nodes in the membership list, and if there is no response from a particular node, it assumes the node is inactive.

If the selected processor is not active, then the membership list is scanned, again until an active member is located. When an active processor is obtained from the list, then this processor is the new group leader for the processor group, STEP 506 "SELECTED MEMBER IS NEW GROUP LEADER."

For example, assume that three processing nodes joined Processor Group X in the following order:

Processor 2, Processor 1, and Processor 3.

Figure 6A:
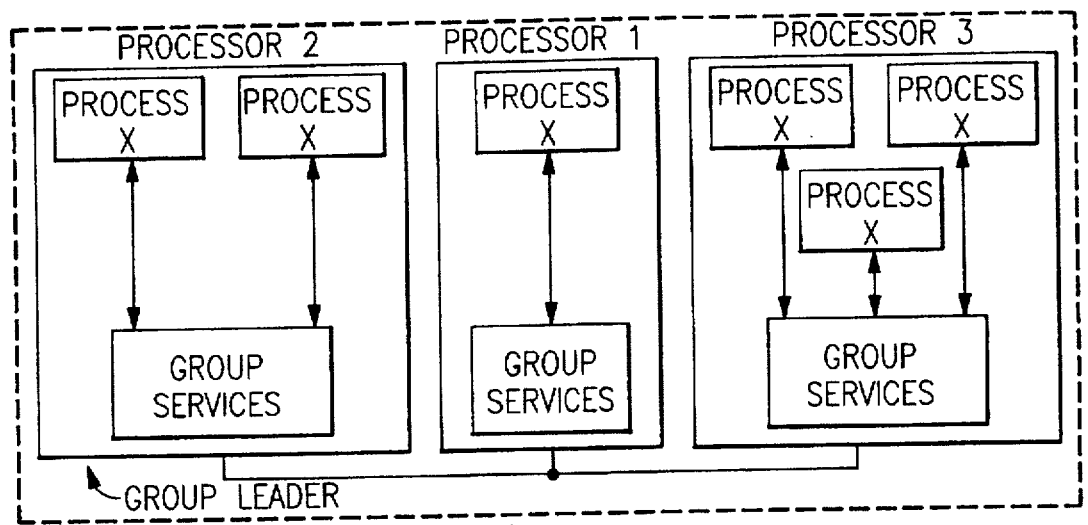
FIG. 6a illustrates one example of a group leader, in accordance with the principles of the present invention.
Figure 6B:
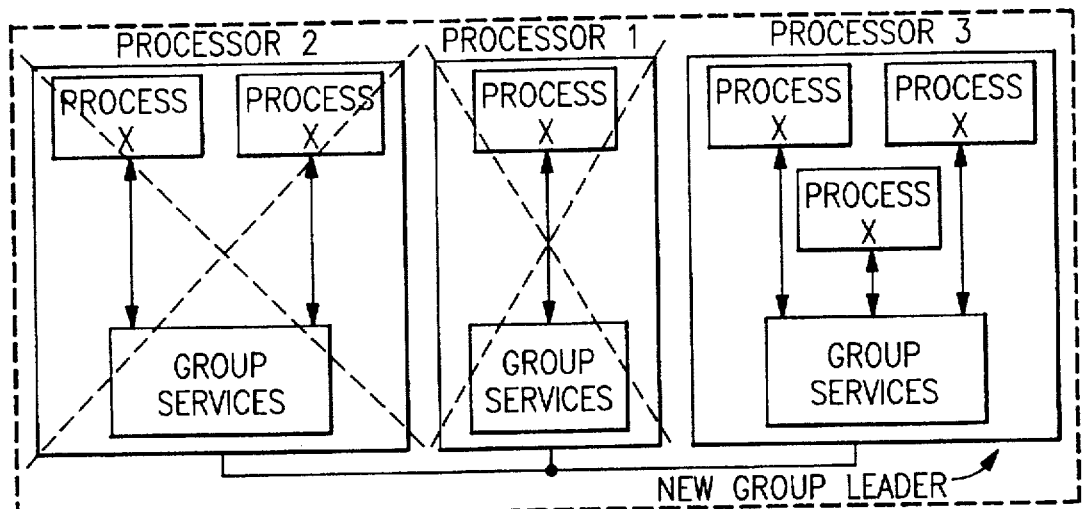
FIG. 6b illustrates a technique for selecting a new group leader when the current group leader fails, in accordance with the principles of the present invention.

Thus, Processor 2 is the initial group leader (see FIG. 6a). At some time later, Processor 2 leaves Processor Group X, and therefore, a new group leader is desired. According to the membership list for Processor Group X, Processor 1 is the next group leader. However, if Processor 1 is inactive, then Processor 3 would be chosen to be the new group leader (FIG. 6b).

In accordance with the principles of the present invention, in one example, the membership list is stored in memory of each of the processing nodes of the processor group. Thus, in the above example, Processor 1, Processor 2, and Processor 3 would all contain a copy of the membership list. In particular, each processor to join the group receives a copy of the membership list from the current group leader. In another example, each processor to join the group receives the membership list from another member of the group other than the current group leader.

Figure 7:
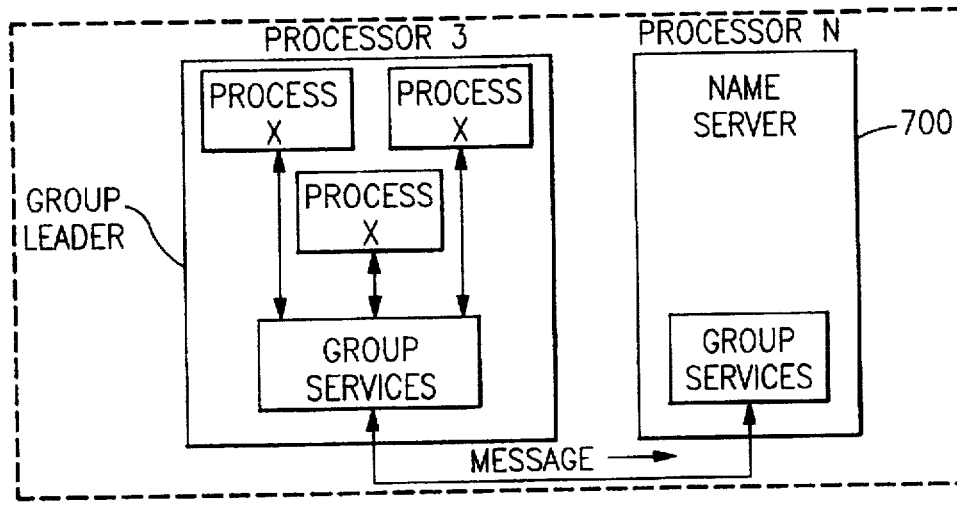
FIG. 7 depicts one example of a name server receiving information from a group leader, in accordance with the principles of the present invention.

Referring back to FIG. 5a, in one embodiment of the invention, once the new group leader is selected, the new group leader informs a name server that it is the new group leader, STEP 508 "INFORM NAME SERVER." As one example, a name server 700 (FIG. 7) is one of the processing nodes within the distributed computing environment designated to be the name server. The name server serves as a central location for storing certain information, including, for instance, a list of all of the processor groups of the network and a list of the group leaders for all of the processor groups. This information is stored in the memory of the name server processing node. The name server can be a processing node within the processor group or a processing node independent of the processor group.

In one example, name server 700 is informed of the group leader change via a message sent from the Group Services daemon of the new group leader to the name server. Thereafter, the name server then informs the other processors of the group of the new group leader via, for example, an atomic multicast, STEP 510 "INFORM OTHER MEMBERS OF THE GROUP" (FIG. 5a). (Multicasting is similar in function to broadcasting, however, in multicasting the message is directed to a selected group, instead of being provided to all processors of a system. In one example, multicasting can be performed by providing software that takes the message and the list of intended recipients and performs point to point messaging to each intended recipient using, for example, a User Datagram Protocol (UDP) or a Transmission Control Protocol (TCP). In another embodiment, the message and list of intended recipients are passed to the underlying hardware communications, such as Ethernet, which will provide the multicasting function.)

In another embodiment of the invention, a member of the group other than the new group leader informs the name server of the identity of the new group leader. As a further example, the processors of the group are not explicitly informed of the new group leader, since each processor in the processor group has the membership list and has determined for itself the new group leader.

Figure 5B:
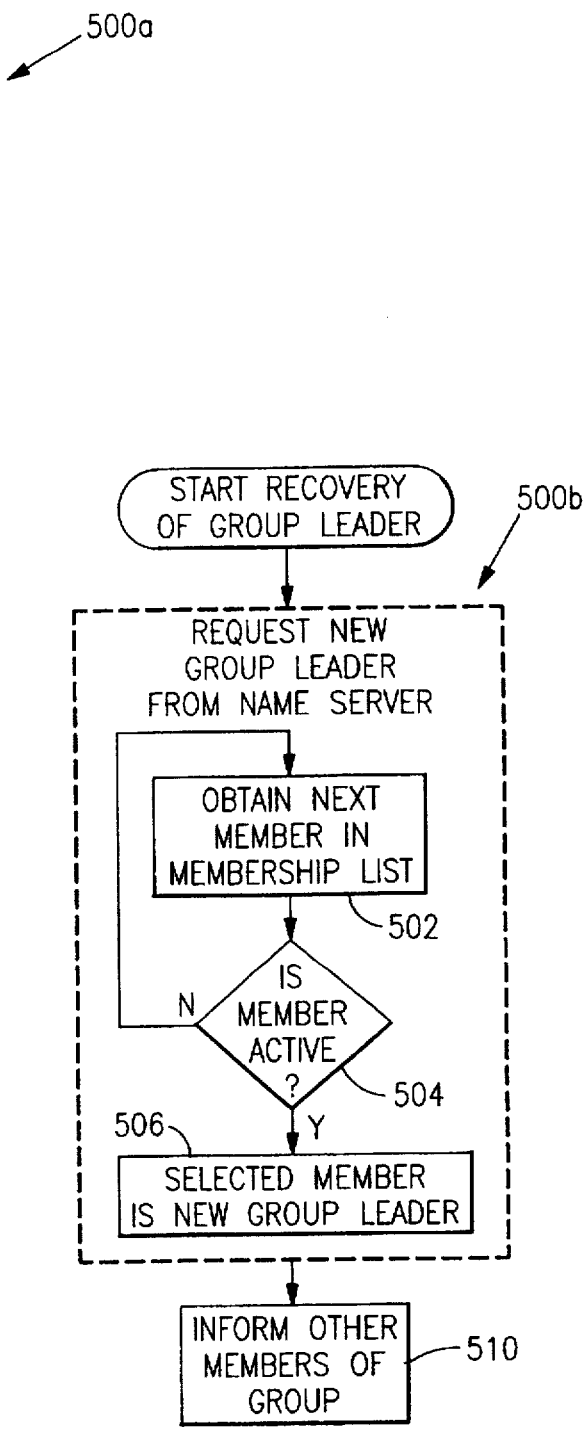
FIG. 5b depicts another example of the logic associated with recovering from a failed group leader of the processor group of FIG. 4, in accordance with the principles of the present invention.

In yet another embodiment of the invention, when a new group leader is needed, a request is sent to the name server requesting from the name server the identity of the new group leader, STEP 500b "REQUEST NEW GROUP LEADER FROM NAME SERVER" (FIG. 5b). In this embodiment, the membership list is also located at the name server, and the name server goes through the same steps described above for determining the new group leader, STEPS 502, 504 and 506. Once it is determined, the name server informs the other processors of the processor group of the new group leader, STEP 510 "INFORM OTHER MEMBERS OF THE GROUP."

In addition to the group leader maintenance function implemented by the internal or metagroup layer, an insert function is also implemented. The insert function is used when a Group Services daemon (i.e., a processor executing the Group Services daemon) wishes to join a particular group of processors. As described above, a processor requests to be added to a particular processor group when a process executing on the processor wishes to join a process group and the processor is unaware of the process group.

Figure 8:
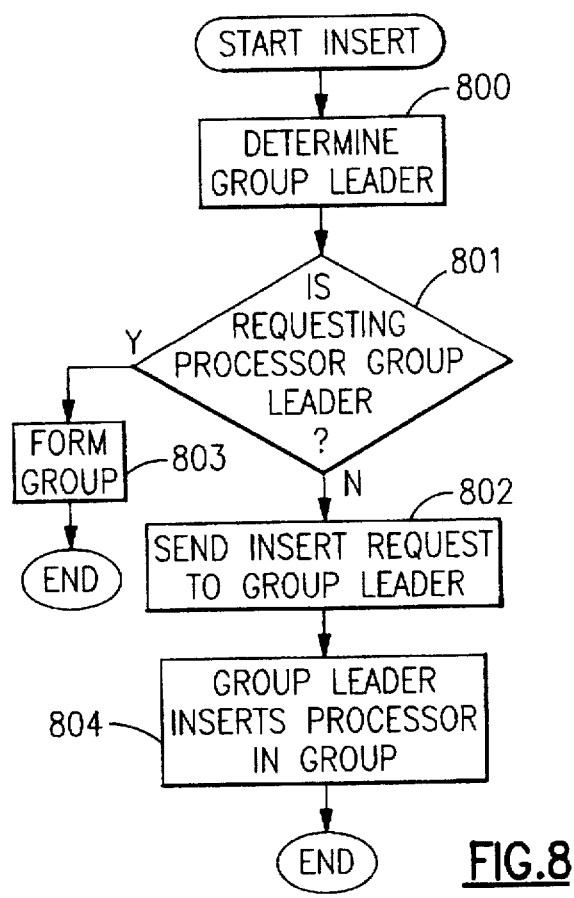
FIG. 8 depicts one example of the logic associated with adding a processor to a group of processors, in accordance with the principles of the present invention.

In one example, in order to become a member of a processor group, the processor wishing to join the group first determines who is the group leader of the processor group, STEP 800 "DETERMINE GROUP LEADER" (FIG. 8). In one embodiment, the group leader is determined by providing name server 700 with the name of the processor group and requesting from the name server the identity of the group leader for that group.

Should the name server respond that the requesting processor is the group leader (since this is the first request for the group), INQUIRY 801, the requesting processor forms the processor group, STEP 803 "FORM GROUP." In particular, it creates a membership list for that particular processor group, which includes the requesting processor.

If the processor is not the group leader, then it sends an insert request, via a message, to the group leader, the identity of which is obtained from the name server, STEP 802 "SEND INSERT REQUEST TO GROUP LEADER." The group leader then adds the requesting processor to the processor group, STEP 804 "GROUP LEADER INSERTS PROCESSOR IN PROCESSOR GROUP." In particular, in one embodiment, the Group Services daemon of the group leader updates its membership list and informs, via a multicast, each other Group Services daemon of the processor group to add the joining processor to the membership list located at that processor. In particular, as one example, the group leader informs the other daemons, via a multicast, of the update, the daemons acknowledge the update, and then the group leader sends out a commit for the change via another multicast. (In another embodiment, the informing can be performed via an atomic multicast.) In one example, the joining processor is added to the end of the membership list, since the list is maintained by order of joins to the group.

Figure 9:
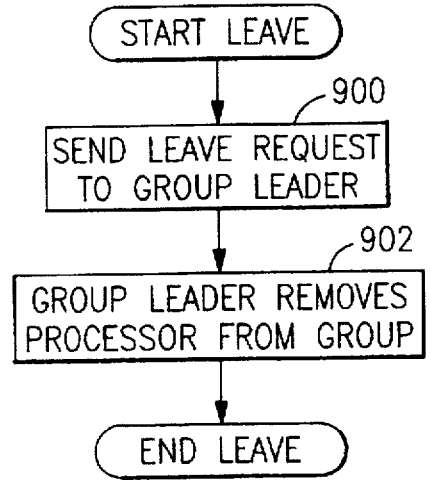
FIG. 9 depicts one example of the logic associated with a processor leaving a group of processors, in accordance with the principles of the present invention.

In accordance with the principles of the present invention, a processor that is a member of a processor group may request to leave the group. Similar to the insert request, a leave request is forwarded to the group leader via, for instance, a message, STEP 900 "SEND LEAVE REQUEST TO GROUP LEADER" (FIG. 9). Thereafter, the group leader removes the processor from the group by, for example, deleting the processor from its membership list and informing all members of the processor group to also remove the processor from their membership list, STEP 902 "GROUP LEADER REMOVES PROCESSOR FROM GROUP." Additionally, if the leaving processor is the group leader, then group leader recovery takes place, as described above.

In addition to the above, if a processor fails, or if the Group Services daemon executing on the processor fails, the processor is removed from the processor group. In one embodiment, when the Group Services daemon fails, it is assumed that the processor fails. In one example, a failed processor is detected by a subsystem running within the distributed computing environment that detects processor failure. When there is a failure, in one instance, the processor is removed by the group leader. In particular, the group leader deletes the processor from its membership list and informs the other member processors to do the same, as described above.

Another function implemented by the internal layer of Group Services is a multicast function. In accordance with the principles of the present invention, a member of a processor group can multicast a message to the other members of the group. This multicast can include one-way multicasts, as well as acknowledged multicasts.

In one embodiment, in order to multicast a message from one member of a group to other members of the group, the message sending member sends the message to the group leader of the group, and the group leader multicasts the message to the other members.

In accordance with the principles of the present invention, prior to sending a message, the group leader assigns a sequence number to the message. Assigned sequence numbers are kept in numerical order. Thus, if a member of the processor group (i.e., Group Services) receives a message having a sequence number out of order, it knows that it has missed a message. For instance, if a processing node receives messages 43 and 45, it knows it missed message 44.

In accordance with the principles of the present invention, the processing node can retrieve the missing message from any of the processing nodes in the processor group, since all of the nodes in the group have received the same messages. However, in one example, the processing node missing the information requests it from the group leader. However, if it is the group leader that is missing the message, then it can request it from any of the other processing nodes in the processor group. This is possible since key data is replicated across all of the processing nodes of the processor group, in a recoverable fashion. There is no need, in accordance with the present invention, to store the data required for recovery in persistent storage. The technique of the present invention eliminates the need for persistent stable hardware-based storage for storing recovery data.

If, for example, the group leader fails, a new group leader is selected, as described above. The group leader ensures that it has all of the messages by communicating with the processing nodes of the group. In one embodiment, once the group leader is sure that it has all of the messages, it ensures that all of the other processing nodes of the group also have those messages. The technique of the present invention thus, allows recovery from a failed processing node, failed processes, or link without requiring stable storage.

In accordance with the principles of the present invention, each processor group maintains its own ordered set of messages. Thus, the messages for one processor group will not overlap or interfere with the messages of another processor group. The processor groups, along with their ordered messages, are independent of one another. Therefore, one processor group may receive an ordered set of messages of 43, 44 and 45, while another processor group may receive an independently ordered set of messages of 1, 2 and 3. This avoids the need for all to all communication among all of the processors of a network.

In one embodiment of the invention, each processing node retains the messages it receives for a certain amount of time, in case it needs to provide the message to another node or in case it becomes the group leader. The messages are saved until the messages are received by all of the processors of the group. Once the messages are received by all of the processors, then the messages can be discarded.

In one example, it is the group leader that informs the processing nodes that the messages have been received by all of the nodes. Specifically, in one example, when a processing node sends a message to the group leader, it includes an indication of the last message that it has seen (i.e., the last message in proper order). The group leader collects this information, and when it sends a message to the processing nodes, it includes in the message the sequence number of the last message seen by all of the nodes. Thereafter, the processing nodes can delete those messages indicated as being seen.

In accordance with the principles of the present invention, the multicast stream is advantageously quiesced at certain times to insure all processor group members have received all of the messages. For example, the stream is quiesced when there have been no multicasts for a certain period of time or after some number of NoAckRequired (i.e., no acknowledgment required) multicasts have been sent. In one embodiment, when the multicast stream is to be quiesced, the group leader sends out a SYNC multicast, which all processor group members acknowledge. When a processor group member receives such a message, it knows that it has (or should have) all of the messages, based on the sequence number of the SYNC message. If it is missing any messages, it obtains the messages before acknowledging. When the group leader receives all of the acknowledgments to this multicast, it knows that all processor group members have received all of the messages, and therefore, the multicast stream is synced and quiesced.

In another embodiment of the invention, a specific SYNC multicast is not necessary. Instead, one of the following techniques can be used to quiesce the multicast stream. As one example, a multicast requiring an acknowledgment can be sent from the group leader to the processors. When a processor receives a multicast that requires an acknowledgment, it sends the acknowledgment to the group leader. The acknowledgment contains the sequence number of the multicast it is acknowledging. The processors use this sequence number to determine if they are missing any messages. If so, they request the missing messages from the group leader, as one example. After the group leader multicasts the ACK-required message to all of the processors of the group and receives all of the acknowledgments, the group leader knows that the stream is quiesced. The non-group leader processors rely on the group leader to insure that they receive all the messages in a timely fashion, so they do not need to periodically acknowledge or ping the group leader to insure they have not missed a multicast.

As a further example, in those situations in which NoAck-Required multicasts are being used, the group leader can alter one of the NoAckRequired multicasts into an AckRequired multicast, thus using it as a sync in the manner described above. Thus, no explicit SYNC message is required.

In addition to the above, in another example, it is possible for the non-group leader processors to anticipate the group leader's action, such that if the number of NoAckRequired messages approaches the window size (i.e., e.g., reaches a predetermined number, such as five, in one example) or if a maximum idle time approaches, the non-group leader processors can send an ACK to the group leader. The ACK provides to the group leader the highest sequence number multicast that each processor has received. If all of the non-group leader processors do this, then it is not necessary for the group leader to turn a NoAckRequired multicast into an AckRequired multicast. Therefore, the group is not held up by waiting for all of the acknowledgments.

Support for the above feature of the present invention is transparent to the users of Group Services (i.e., the processes). No explicit actions are necessary by the processes to implement this feature. Additionally, this support is available in the internal and external layers of Group Services.

Referring back to FIG. 3, external layer 304 implements a richer set of mechanisms of the application programming interface that is easy for the user (i.e., the client processes) to understand.

In one example, these mechanisms include an atomic multicast, a 2-phase commit, barrier synchronization, process group membership, processor group membership, and process group state value, each of which is described below. These mechanisms, as well as others, are unified, in accordance with the principles of the present invention, by the application programming interface, into a single, unified framework that is easy to understand. In particular, communications and synchronization mechanisms (in addition to other mechanisms) have been unified into a single protocol.

Figure 10:
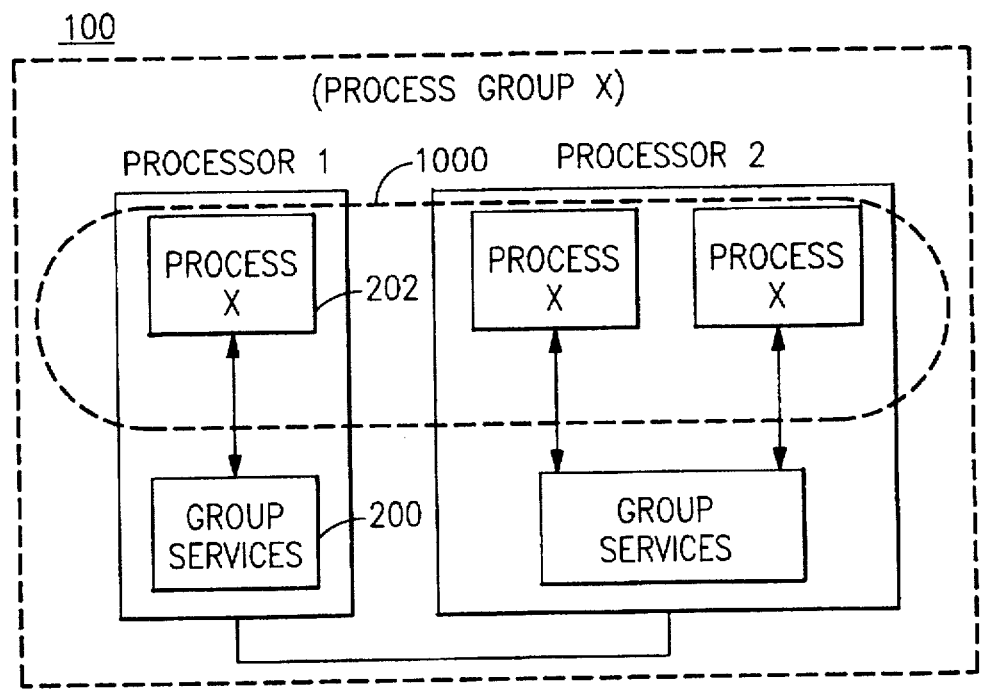
FIG. 10 illustrates one embodiment of a process group, in accordance with the principles of the present invention.

In accordance with the principles of the present invention, the single, unified framework is provided to members of process groups, as described in detail herein. A process group includes one or more related processes executing on one or more processing nodes of the distributed computing environment. For example, referring to FIG. 10, a Process Group X (1000) includes a Process X executing on Processor 1 and two Process X's executing on Processor 2. The manner in which a process becomes a member of a particular process group is described in detail further below.

Process groups can have at least two types of members, including a provider and a subscriber. A provider is a member process that has certain privileges, such as voting rights, and a subscriber has no such privileges. A subscriber can merely watch the ongoings of a process group, but cannot participate in the group. For example, a subscriber can monitor the membership of a group, as well as the state value of the group, but it cannot vote. In other embodiments, other types of members with differing rights can be provided.

In accordance with the principles of the present invention, the application programming interface is implemented, as described below with reference to FIG. 11.

Figure 11:
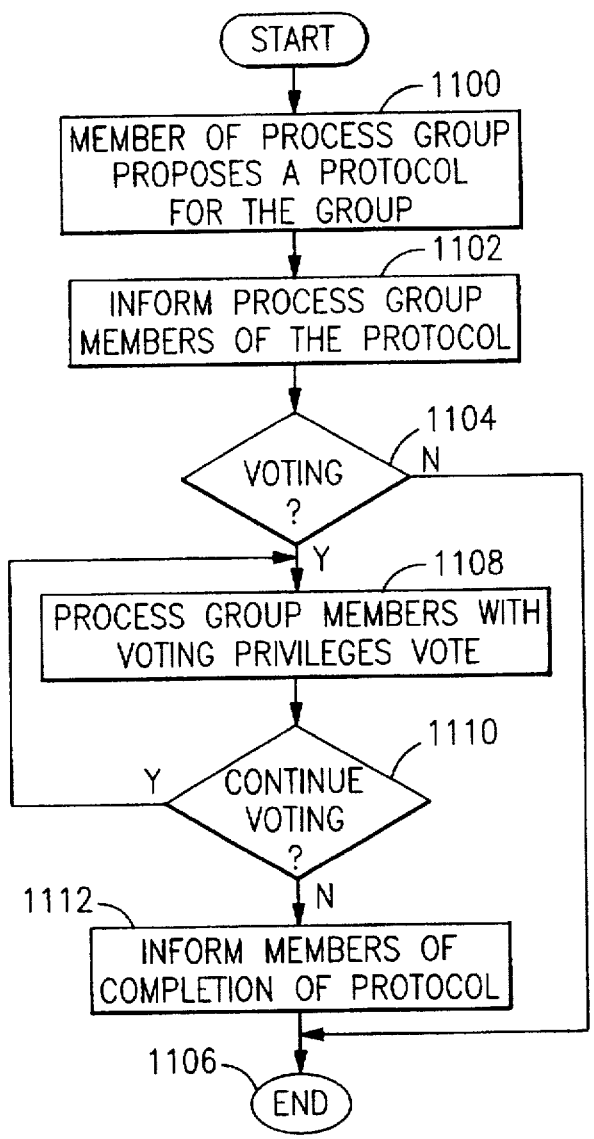
FIG. 11 depicts one example of the logic associated with proposing a protocol for a process group, in accordance with the principles of the present invention.

Referring to FIG. 11, in one example, initially, a provider of a process group proposes a protocol for the group (subscribers cannot propose protocols, in this embodiment), STEP 1100 "MEMBER OF PROCESS GROUP PROPOSES A PROTOCOL FOR THE GROUP." In particular, in one instance, an API call is made proposing the protocol. In one example, the protocol is submitted, by a process, to the external layer of the Group Services daemon on the processor executing the process. That Group Services daemon then submits the protocol to the group leader of the group via a message. The group leader then informs, via a multicast, all of the processors of the related processor group of the protocol. (The internal layer of the daemon is managing this multicast.) Those processors then inform the appropriate members of the process group, via the external layer, of the proposed protocol, STEP 1102 "INFORM PROCESS GROUP MEMBERS OF THE PROTOCOL."

If multiple providers propose a protocol at the same time, then the group leader selects the protocol to be run, in the following manner. In one embodiment, the protocols are prioritized in that any protocol for a failure is first, a join protocol is second, and all other protocols (e.g., requests to leave, expel, update state value and provide a group message, described below) are on a first come first served basis. Thus, if a request to remove a member due to a failure is proposed at the same time as a request to join and a request to leave, then the request to remove is selected first. Then, the request to join is selected, followed by the request to leave.

If there are multiple requests to remove due to failure, then all of these requests are selected prior to the request to join. The requests to remove are selected by the group leader in the order seen by the group leader (unless batching is allowed, as described below). Similarly, if there are multiple request to join, then these are selected in a likewise manner prior to any of the other requests.

In one embodiment, if there are multiple other requests, the first one received by the group leader is selected and the others are dropped. The group leader informs the providers of those dropped requests that they have been dropped and then, they can resubmit them if they wish. In another embodiment of the invention, these other requests can be queued in order of receipt and selected in turn, instead of being dropped.

After a protocol is selected, a determination is made as to whether voting should be performed for the protocol, INQUIRY 1104 "VOTING?" In one example, the process proposing the protocol indicates during the initial proposal whether voting is to take place. If the proposal indicates no voting, then the protocol is simply an atomic multicast, and the protocol is complete, STEP 1106 "END."

If voting is to take place, then each provider of the process group votes on the protocol, STEP 1108 "PROCESS GROUP MEMBERS WITH VOTING PRIVILEGES VOTE." Specifically, in accordance with the principles of the present invention, the voting allows each provider to take local actions necessary to satisfy the group, and to inform the group of the results of those actions. This functions as a barrier synchronization primitive by ensuring that all providers have reached a particular point before proceeding.

In one embodiment of the present invention, each provider votes by casting a vote value, which may include one of the following, as an example:

(a) APPROVE specifying that the provider wishes to complete the protocol once all of the providers have reached this barrier, and to accept all the proposed changes;

(b) CONTINUE specifying that the provider wishes to continue the protocol through another voting step, and proposed changes remain pending; and (c) REJECT specifying that the provider wishes to end this protocol once all the providers have reached this barrier, and to reject those proposed changes that can be rejected.

In accordance with the principles of the present invention, each provider of the process group forwards its vote to the Group Services daemon executing on the same processor as the process. The Group Services daemon then forwards the vote values it receives to the group leader for the metagroup associated with that process group. For instance, the vote values for Process Group X are forwarded to the group leader of Processor Group X. Based on the vote values, the group leader determines how the protocol should proceed. The group leader then multicasts the result of the voting to each of the processors of the appropriate processor group (i.e., to the Group Services daemons on those processors), and the Group Services daemons inform the providers of the result value. For example, the group leader informs the Group Services daemons of Processor Group X and the Group Services daemons provide the result to the providers of Process Group X.

If one of the providers voted CONTINUE and none of the providers voted REJECT, INQUIRY 1110 "CONTINUE VOTING?", then the protocol proceeds to another voting step, STEP 1108. That is, the providers are performing barrier synchronization with a dynamic number of synchronization phases. In particular, in accordance with the principles of the present invention, the number of voting steps (or synchronization phases or points) that a protocol can have is dynamic. It can be any number of steps desired by the voting members. The protocol can continue as long as any provider wishes for the protocol to continue. Thus, in one embodiment, the voting dynamically controls the number of voting steps. However, in another embodiment, the dynamic number of voting steps can be set during the initiation of the protocol. It is still dynamic, since it can change each time the protocol is initialized.

If the providers vote not to continue to another voting step, then the protocol is a 2-phase commit. After the voting is complete (either for a two-phase or multi-phase vote), the result of the vote is provided to the members. In particular, should any one provider of the process group vote REJECT, then the protocol ends and the proposed changes are rejected. Each of the providers is informed, via a multicast, that the protocol has been rejected, STEP 1112 "INFORM MEMBERS OF COMPLETION OF PROTOCOL." On the other hand, if all of the providers voted APPROVE, then the protocol is complete and all of the proposed changes are accepted. The providers are informed of the approved protocol, via a multicast, STEP 1112 "INFORM MEMBERS OF COMPLETION OF PROTOCOL."

In accordance with the principles of the present invention, the above-described protocol is also integrated with process group membership and process group state values. In particular, the mechanisms of the present invention are used to manage and monitor membership changes to the process groups. Changes to group membership are proposed via the protocol described above. Additionally, the mechanisms of the present invention mediate changes to the group state value, and guarantee that it remains consistent and reliable, as long as at least one process group member remains.

A group state value for the process group acts as a synchronized blackboard for the process group. In one embodiment, the group state value is an application specific value controlled by the providers. The group state value is part of the group state data maintained for each process group by Group Services. In addition to the group state value, the group state data includes a provider membership list for that group. Each provider is identified by a provider identifier and the list is ordered by Group Services such that the oldest provider (the first provider joining the group) is at the head of the list, and the youngest is at the end.

Changes to the group state value are proposed by group members (i.e., the providers) via the protocol described above. In one embodiment, the contents of the group state value are not interpreted by Group Services. The meaning of the group state value is attached by the group members. The mechanisms of the present invention guarantee that all process group members see the same sequence of changes to the group state values, and that all process group members will see the updates.

Thus, as described above, the application programming interface of the present invention provides a single, unified protocol that includes a plurality of mechanisms including, for example, an atomic multicast, 2-phase commit, barrier synchronization, group membership and group state value. The manner in which the protocol is used for group membership and the group state value is described in further detail below.

Figure 12:
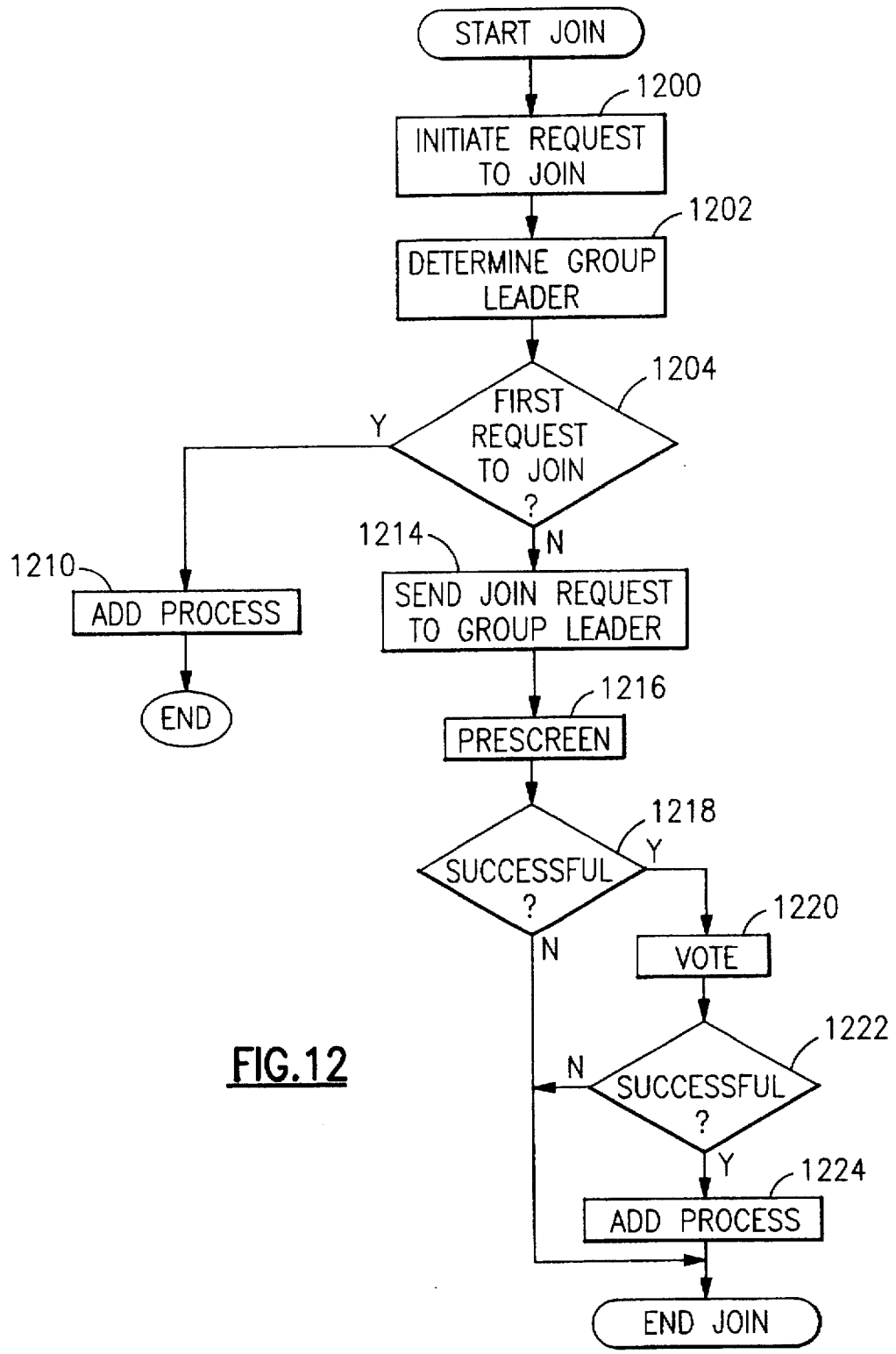
FIG. 12 depicts one example of the logic associated with a process requesting to join a process group, in accordance with the principles of the present invention.

The voting mechanism described above is used, in accordance with the principles of the present invention, to propose changes to the membership of a process group. For instance, if a process wishes to join a particular process group, such as Process Group X, then that process issues a join call, STEP 1200 "INITIATE REQUEST TO JOIN" (FIG. 12). In one embodiment, this call is sent as a message across a local communications path (e.g., a UNIX domain socket) to the Group Services daemon on the processor executing the requesting process. The Group Services daemon sends a message to the name server asking the name server for the name of the group leader for the process group that the requesting process wishes to join, STEP 1202 "DETERMINE GROUP LEADER."

If this is the first request to join the particular process group, then the name server informs the Group Services daemon that it is the group leader, INQUIRY 1204 "FIRST REQUEST TO JOIN?". Thus, the processor creates a processor group, as described above, and adds the process to the process group, STEP 1210 "ADD PROCESS." In particular, the process is added to a membership list for that process group. This membership list is maintained by Group Services, for example, as an ordered list. In one example, it is ordered in sequence of joins. The first process to join is first in the list, and so forth.

In accordance with the principles of the present invention, the first process to join a process group identifies a set of attributes for the group. These attributes are included as arguments in the join call sent by the process. These attributes include, for instance, the group name, which is a unique identifier, and prespecified information that defines to Group Services how the group wishes to manage various protocols. For instance, the attributes can include an indication of whether the process group will accept batched requests, as described below. Additionally, in another example, the attributes can include a client version number representing, for example, the software level of the programming in each provider. This will ensure that all group members are at the same level. The above-described attributes are only one example. Additional or different attributes can be included without departing from the spirit of the claimed invention.

Returning to INQUIRY 1204 "FIRST REQUEST TO JOIN?", if this is not the first request to join, then the join request is sent via a message to the group leader, designated by the name server, STEP 1214 "SEND JOIN REQUEST TO GROUP LEADER." The group leader then performs a prescreening test, STEP 1216 "PRESCREEN." In particular, the group leader determines whether the attributes specified by the requesting process are the same as the attributes set by the first process of the group. If not, then the join request is rejected.

However, if the prescreen test is successful, then the providers of the process group are informed of the request via, for instance, a multicast from the group leader, and the providers vote on whether to allow the process to be added to the group, STEP 1220 "VOTE." The voting takes place, as described above. The providers can vote to continue the protocol and vote on this join again, or they can vote to reject or approve the join. If one of the providers votes REJECT, then the join is terminated and the process is not added to the group, INQUIRY 1222 "SUCCESSFUL?". However, if all of the providers vote APPROVE, then the process is added to the group, STEP 1224 "ADD PROCESS." In particular, the process is added to the end of the membership list for the group. Once the protocol is complete, the members of the group are notified of the result. In particular, in one example, all of the members (including the providers and subscribers) are notified when the process is added, but only the providers are notified when the protocol has been rejected. In another example, other types of members may also be notified, as deemed appropriate.

Join requests are used by providers to join a process group, as described above. A provider is afforded certain benefits, such as voting rights. Processes can also subscribe to a process group, however, by issuing an API subscribe call (as opposed to a join call). A subscriber is provided the ability to monitor a particular process group, but not to participate in the group.

When a subscribe call is issued, it is forwarded to the Group Services daemon on that processor and that Group Services daemon keeps track of it. If the Group Services daemon is not a part of the processor group, then it will become inserted into the group, as previously described. In one embodiment, there is no voting for the subscriber, and other members of the group, including the providers and any other subscribers, are not aware of the subscriber. A subscriber cannot subscribe to a process group that is not already created.

Figure 13:
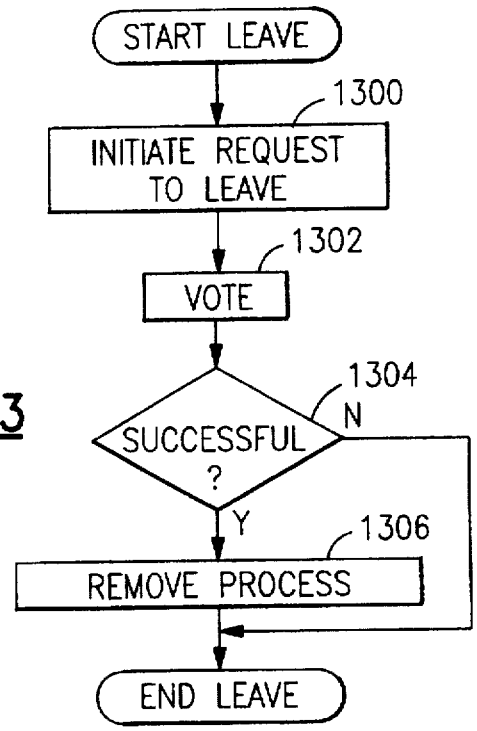
FIG. 13 depicts one example of the logic associated with a member of a process group requesting to leave the group, in accordance with the principles of the present invention.

Group membership can also be altered by a group member leaving or being removed from a group. In one example, a group member wishing to leave a group, sends a request to leave to the group leader, in the manner described above, STEP 1300 "INITIATE REQUEST TO LEAVE" (FIG. 13). The group leader sends a multicast to the providers requesting the providers to vote on the proposed change, STEP 1302 "VOTE." The vote takes place in the manner described above, and if all of the providers vote APPROVE, INQUIRY 1304, then the process is removed from the membership list for that process group, STEP 1306 "REMOVE PROCESS," and all of the group members are notified of the change. However, if one of the providers votes REJECT, then the process remains a part of the process group, the protocol is terminated, and the providers are notified of the rejected protocol. Of course, if none of the providers votes REJECT and any one of the providers votes CONTINUE, then the protocol continues to another round of voting.

A member of a group may leave the group involuntarily when it is expelled from the group via an approved expel protocol proposed by another process of the group, or when the group member fails or the processor in which it is executing fails. The manner in which an expulsion is performed is the same as that described above for a member requesting to leave a group, except that the request is not initiated by a process wishing to leave, but instead by a process desiring to remove another process from the group.

Likewise, in one embodiment, the technique for removing a process when the process fails or when the processor executing the process fails, is similar to that technique used to remove a process requesting to leave. However, instead of the process initiating a request to leave, the request is initiated by Group Services, as described below.

In the case of a process failure, in one example, the group leader is informed of the failure by the Group Services daemon running on the processor of the failed process. The Group Services daemon determines that the process has failed, when it detects that a stream socket (known to those skilled in the art) associated with the process has failed. The group leader then initiates the removal.

In the case of a processor failure, the group leader detects this failure and initiates the request to remove. If it is the group leader that has failed, then group leader recovery is performed, as described herein, before the request is initiated. In one embodiment, the group leader is informed of the processor failure by a subsystem that is distributed across the processing nodes of the network. This subsystem sends out signals to all of the processing nodes and if the signal is not acknowledged by a particular node, that node is considered down (or failed). This information is then broadcast to Group Services.

As described above, when a process wishes to join a group or a group member wishes to leave or is removed from the group, the group leader informs each of the group providers of the proposed change, so that the providers can vote on that change. In accordance with the principles of the present invention, these proposed membership changes can be presented to the group providers either singly (i.e., one proposed group membership change per protocol) or batched (i.e., multiple proposed group membership changes per protocol). In the case of batched requests, the group leader collects the requests for a prespecified amount of time, as one example, and then presents to the group providers one or more batched requests. Specifically, one batched request is provided, which includes all of the join requests collected during that time, and another batched request is provided, which includes all of the leave or remove requests collected. In one embodiment, one batched request can only include all joins or all leaves (and removals), and not a combination of both. This is only one example. In other examples, it is possible to combine both types of requests.

When a batched request is forwarded to the group providers, the group providers vote on the entire batched request, as a whole. Thus, either the entire batch is accepted, continued or rejected.

In accordance with the principles of the present invention, each process group can determine whether it is willing to allow requests to be batched or not. Additionally, each process group can determine whether some types of requests are allowed to be batched, while others are not. For instance, assume there are a number of process groups executing in the network. Process Group W can decide that it wants to receive batched requests for all types of requests, while Process Group X can independently decide that it wants to receive all requests serially. Additionally, Process Group Y can allow batched request for only join requests, while Process Group Z allows batched requests only for leave or removal requests. Thus, the mechanisms of the present invention provide flexibility in how requests are presented and voted on.

Although the system is flexible, there are a number of rules that have been instituted in one embodiment of the invention to ensure consistent and reliable group membership. These rules include the following, as one example:

1. No group member can be shown to be failing and leaving the group before it has joined the group.
2. No group member can be shown to be joining a group a second time, before its initial failure has been handled.
3. Where a group has both requests to join, and has established members in a failed state, all of the failed members are dealt with (via one or more of the failure protocols) before any of the requests to join can be satisfied.
4. All non-failed group providers, including those requesting to join, see the same sequence of protocols and membership lists.

Described above in detail is how the voting protocol of the present invention is used to manage group membership. The voting protocol can also be used, however, to propose a group state value, in accordance with the principles of the present invention. In particular, during a voting phase, a provider of the process group can propose to change the state value of the group, in addition to providing a vote value. This provides a mechanism to allow group providers to reflect group information reliably and consistently to other group members. In one example, the group state value (and other information, such as, a message, and an updated vote value, as described herein) is provided with the vote value via a vote interface that allows for various arguments to be presented.

For example, when a member joins or leaves the group, the group is driven through a multi-step protocol, as described above. During each voting step, the group members perform local actions to prepare for the new member, or to recover from the loss of the failed member. Based on the results of these local actions, for instance, one or more of the providers may decide to modify the group state value. In one example, the group state value can be "active," indicating that the process group is ready to accept service requests; "inactive," indicating that the process group is shutdown because, for instance, the group does not have enough members; or "suspend," indicating that the process group will accept requests, but is temporarily not processing the requests.

Group Services guarantees that the updates to the group state value are coordinated, such that the group providers will see the same consistent value. If the protocol is APPROVED, then the latest updated proposed group state value is the new group state value. If the protocol is REJECTED, then the group's state value remains as it was before the rejected protocol began execution.

In accordance with the principles of the present invention, the voting protocol can also be used to multicast messages to the group members. For example, in addition to providing a vote value, a provider can include a message that is to be forwarded to all other members of the process group. Unlike the group state value, this message is not persistent. Once it is shown to the group members, Group Services no longer keeps track of it. However, Group Services does guarantee delivery to all non-failed group providers.

The message can be used by a group provider, for instance, to forward significant information during the protocol that cannot be carried by the other responses within a vote. For example, it can be used to provide information that cannot be reflected in the provider's vote value or to provide information that does not need to be made persistent. In one example, it can inform the group members of a particular function to perform.

In accordance with one embodiment of the present invention, each provider of a process group is expected to vote at a voting phase of a protocol. Until all of the providers vote, the protocol remains uncompleted. Thus, a mechanism is provided in the voting protocol, in accordance with the principles of the present invention, in order to handle the situation in which one or more providers have not provided a vote. In particular, the voting mechanism includes a default vote value, which is explained in detail below.

As examples, a default vote value is used when a provider fails during the execution of the protocol or when the processor in which the provider is executing fails or if the provider becomes non-responsive, as described herein. The default vote value guarantees forward progress for the protocol and for the process group. A process group initializes its default vote value when the group is first formed by, for example, its attributes. In one embodiment, the default vote value can either be APPROVE or REJECT. During each voting phase, the default vote value can be changed to reflect changing conditions within the group.

In the situation in which a process fails during the protocol, Group Services determines this, as described above, and thus, at any voting phase for the protocol, the group leader will submit the group's current default vote for the failed process. Similarly, if Group Services determines that the processor executing a member provider has failed, then the group leader once again submits a default vote.

If, however, a processor or process is available but non-responsive, then the default vote value can also be used. In one example, a process is deemed non-responsive when it does not respond to a vote within a time limit set by the process group for that protocol. (Each protocol for each process group can have its own time limit.) When the process is non-responsive, the default vote value assigned to the process group is used by the group leader for this particular process. In one embodiment, it is possible to have no time limit. In that situation, Group Services will wait until the provider eventually responds or until it fails.

In one embodiment, when a default vote is used, the providers are informed of this.

In accordance with the principles of the present invention, a provider can dynamically update the default vote value at any one or more of the voting steps within the protocol. This allows flexibility in the handling of failures, as the protocol progresses. The proposed default value is submitted along with the vote value of the process. The new default vote value remains in effect for the remainder of the protocol, unless another default vote value is proposed at a later voting step. If multiple default vote values are proposed at a particular voting step, then in one embodiment, Group Services (i.e., the group leader) selects the value submitted by the first process to respond. Once the protocol is complete, the default vote value for the process group reverts back to the value initially set for the group.

A default vote value is treated in the same manner as any other vote value. However, default vote values cannot, in one embodiment, include other information for the vote, such as, for instance, a message, a group state value or a new proposed updated default vote value.

As described above with reference to FIG. 11, all of the above-described proposed protocols can be proposed as one-phase protocols in which the protocol is proposed and accepted in one multicast. Therefore, it is not necessary to take a vote.

Described in detail above are mechanisms for ensuring highly-available multicomputer applications. As one example, the mechanisms of the present invention can be used for providing a fault-tolerant and highly-available system. The mechanisms of the present invention advantageously provide a general purpose facility for coordinating, managing and monitoring changes to the state of process groups executing within the system.

In accordance with the principles of the present invention, membership within processor groups and process groups can be dynamically updated. In both cases, processors or processes can request to be added or removed from a group. The mechanisms of the present invention ensure that these changes are performed consistently and reliably.

Additionally, in accordance with the principles of the present invention, mechanisms are provided for enabling messages to be sent to one or more particular groups of processors, without having to send the messages to all of the processor groups. Each processor group has the ability to monitor and manage its own set of messages and for determining if one or more messages has been missed. If a message has been missed, that message is then retrieved from another member of the group. There is no need to maintain stable storage for these messages. Each member of the group has the messages, and thus, can provide missing messages to other members. This advantageously reduces the costs of hardware.

Further, in accordance with the principles of the present invention, mechanisms are provided for recovering from a failed group leader. These mechanisms ensure that a new group leader is selected easily and efficiently.

The mechanisms of the present invention also provide an application programming interface that unifies a number of protocols into one single, integrated framework for the processes. As one example, the integrated application programming interface provides a facility for communicating between members of process groups, as well as a facility for synchronizing processes of a process group. Additionally, the same interface provides a facility for dealing with membership changes to process groups, as well as changes to group state values.

The application programming interface also includes a mechanism that enables Group Services to monitor the responsiveness of the processes. This can be performed in a similar fashion as to a ping mechanism used in computer network communications.

In addition to the above, the mechanisms of the present invention provide a dynamic barrier synchronization technique. In accordance with the principles of the present invention, the number of synchronization phases included in any one protocol is variable, and can be determined by the members voting on the protocol.

The mechanisms of the present invention can be included in one or more computer program products including computer useable media, in which the media include computer readable program code means for providing and facilitating the mechanisms of the present invention. The products can be included as part of a computer system or sold separately.

The flow diagrams depicted herein are just exemplary. There may be many variations to these diagrams or the steps described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A communications method for a distributed computing environment comprising:

sending a first message to a first group of processors and a second message to a second group of processors;

maintaining, by said first group of processors, said first message and, by said second group of processors, said second message;

said sending said first message comprising;

sending a request to a first group leader of said first group of processors to multicast said first message;

assigning, by said first group leader, a sequence number to said first message providing a first ordered message; and multicasting, by said first group leader, said first ordered message to said first group of processors;

recovering from a failure of said first group leader including determining a new group leader; and wherein said determining comprises obtaining from a membership list ordered in sequence of joins of processors to said first group of processors said new group leader, said new group leader being a next processor in said membership list.

2. The communications method of claim 1, further comprising caching, by said first group of processors, said first message until a predefined condition occurs.

3. The communications method of claim 2, wherein said predefined condition comprises receiving an acknowledgment that said first message has been received by each of said processors of said first group of processors.

4. The communications method of claim 1, wherein said first group of processors is executing a first group of one or more related processes and said second group of processors is executing a second group of one or more related processes.

5. The communications method of claim 1, wherein said sending comprises sending a first plurality of messages to said first group of processors and a second plurality of messages to said second group of processors, and wherein said maintaining comprises maintaining a first sequence order, by said first group of processors, for said first plurality of messages and a second sequence order, by said second group of processors, for said second plurality of messages, said first sequence order and said second sequence order being independent of one another.

6. The communications method of claim 1, further comprising:

determining, by each processor of said first group of processors, whether said first ordered message received via said multicasting is in proper sequence order, wherein an improper sequence order indicates a missing message; and requesting, from a processor of said first group of processors, said missing message when said sequence order is improper.

7. The communications method of claim 1, further comprising determining said first group leader, said determining comprising sending a request to a name server requesting identification of said first group leader.

8. The communications method of claim 1, wherein said determining comprises requesting appointment of said new group leader from a name server, said name server obtaining said new group leader from said membership list.

9. The communications method of claim 8, wherein said name server is a processor within said first group of processors.

10. The communications method of claim 8, wherein said name server is a processor independent of said first group of processors.

11. The communications method of claim 8, wherein said membership list is located within said name server.

12. The communications method of claim 1, wherein said membership list is included in each processor of said first group of processors.

13. The communications method of claim 1, wherein said first group of processors and said second group of processors have one or more processors in common.

14. The communications method of claim 1, wherein said sending said first message comprises:

initiating said first message by a group leader of said first group of processors;

assigning, by said group leader, a sequence number to said first message providing a first ordered message; and multicasting, by said group leader, said first ordered message to said first group of processors.

15. The communications method of claim 14, further comprising:

determining, by each processor of said first group of processors, whether said first ordered message received via said multicasting is in proper sequence order, wherein an improper sequence order indicates a missing message; and requesting, from a processor of said first group of processors, said missing message when said sequence order is improper.

* * * * *